United States Patent [19]

Cline

[11] 4,432,562

[45] Feb. 21, 1984

[54] MOTORCYCLE JACK STAND

[76] Inventor: Jack B. Cline, 12827 Bromwich St., Arleta, Calif. 91331

[21] Appl. No.: 396,826

[22] Filed: Jul. 9, 1982

[51] Int. Cl.³ .......................... B62H 1/02; B62H 1/06
[52] U.S. Cl. .................................. 280/300; 180/219; 280/304
[58] Field of Search ............... 280/293, 298, 299, 300, 280/301, 302, 303, 304; 180/219

[56] References Cited

U.S. PATENT DOCUMENTS

| 1,195,404 | 8/1916 | Scott | 280/299 |
| 1,280,069 | 9/1918 | Morgan | 280/299 |
| 3,712,640 | 1/1973 | Shipman et al. | 280/301 |

Primary Examiner—John A. Pekar
Attorney, Agent, or Firm—Jack C. Munro

[57] ABSTRACT

A motorcycle jack stand which uses a pair of spaced-apart stanchion assemblies which are mounted on the undercarriage of a motorcycle. The stanchion assemblies are movable in unison between a stowage position and an extended position. When in the extended position, each stanchion assembly includes a movable member which is to extend in contact with the ground or street. Within each stanchion assembly is included a ratchet assembly which permits each movable member to further extend, but prevents withdrawing movement. Lateral rocking of the motorcycle causes sequential extension of the stanchion assemblies resulting in at least some portion of the weight of the motorcycle being supported by the stanchion assemblies with the motorcycle positioned vertically upright. The motorcycle jack stand can be operated either by hand or by feet. Initial forward motion of the motorcycle will cause the motorcycle jack stand to automatically retract to the completely stowed position.

20 Claims, 27 Drawing Figures

MOTORCYCLE JACK STAND

TECHNICAL FIELD

The field of this invention relates to a supporting method for a two wheeled vehicle and more particularly to a center stand for a motorcycle.

BACKGROUND OF THE PRIOR ART

The use of supporting stands for two wheeled vehicles has been known for a substantial period of time. When the two wheeled vehicle is not being operated, it is desired to provide some structure to support the two wheeled vehicle in an upright manner. Such a device is generally referred to as a supporting stand.

A common type of supporting stand utilizes a single member which is to protrude from the undercarriage of the motorcycle to contact the ground or street. The motorcycle is to lean and rest in an inclined position by this single supportive member. This type of stand is most adequate for light weight vehicles. However, there are a substantial number of motorcycles each of which weigh several hundred pounds apiece. Because of the weight of the motorcycle, it is not at all uncommon for the motorcycle to merely tip over when supported by such a single member stand. This is especially true if the supportive surface is not hard and level, such as a dirt or gravel surface. Such a heavy motorcycle falling will generally, at the very minimum, be scratched. Denting or other damage is quite common.

To overcome the disadvantages of a single member supporting stand, there has been utilized what is termed a center stand. A center stand is also mounted to the undercarriage of the chassis of the motorcycle in between the front and rear wheels. The center stand is to be moved from the stowed position to the extended position and the operator is to then physically lift one of the wheels of the motorcycle (generally the rear wheel) and to then further longitudinally move the motorcycle a small amount so that the motorcycle will come to rest on the center stand in the completely extended position. This type of stand is generally most satisfactory for light weight motorcycles.

However, in recent years there have been manufactured motorcycles of substantially greater weight. It is not at all uncommon today for a motorcycle to weight seven hundred and fifty pounds. Using the center stand previously described, the user is then required to exert at least two hundred pounds of lifting force to begin to get the motorcycle to be supported on the center stand. Then the operator must subsequently move the motorcycle so as to completely come to rest on the center stand.

It is desirable with heavy weight motorcycles to provide a secure supporting base which will normally prevent the motorcycle from tipping over. In order to use this prior art type of motorcycle center stand, an individual must be relatively strong in order to sufficiently lift the motorcycle and to move it a sufficient amount so that it comes to rest on the center stand. It has been found that the use of such a center stand is not possible by most women. Also, a frail or elderly man does not have sufficient strength in order to manually locate the motorcycle on this type of center stand. Even an average man finds it not particularly easy to so support the motorcycle.

The conventional type of center stand is constructed of two rigid members which are to be in contact with the supportive surface. There is no way to adjust one member with respect to the other member. This type of center stand is designed primarily for use on a hard surface such as a street. However, there are a great many times that a motorcycle is parked on other than a hard surface, such as a dirt road, parking lot, gravel road or off-road terrain. If this terrain is not very nearly level, the motorcycle will assume an inclined position. Because of the weight of such motorcycles, it does not take much leaning for the motorcycle to tip over. Additionally, if the ground is even slightly wet, the center stand will normally just penetrate the ground resulting in the motorcycle not being securely supported and therefore free to tip over.

BRIEF SUMMARY OF THE INVENTION

The motorcycle jack stand of this invention takes the form of a center stand which is to be attached to the undercarriage or lower portion of the chassis of a motorcycle. The center stand of this invention takes the form of two separate stanchion assemblies which are fixedly mounted onto a connecting frame. The connecting frame is pivotally mounted on the motorcycle undercarriage. A center stand is to be pivotable from a retracted/stowed position to an extended/usage position. One of the stanchion assemblies is to be mounted along the right side of the motorcycle, with the other stanchion assembly being mounted on the left side of the motorcycle. The entire center stand is to be located between the front and the rear wheel of the motorcycle. Each stanchion assembly includes a main member which is fixed to the connecting frame and an movable member which is movable in respect to the main member. Each movable member is held in a withdrawn position when the center stand is in stowed position. During movement of the center stand from the stowed position to the extended position, each of the movable members are held in this withdrawn position by a latching assembly. Once the center stand is in the extended position, the latching assembly is released permitting the movable members to move relative to the main members until each movable member by gravity falls into contact with the supportive surface. A ratchet assembly is connected between each movable member and each main member. The ratchet assembly only permits movement of each movable member in the outward or extended position. Back and forth oscillation in a lateral direction causes slight extending of one movable member and then the other movable member and then back to the first movable member, and so forth. In this manner, the motorcycle is raised and supported by the two stanchion assemblies. Although, it is not necessary, generally one wheel of the motorcycle will be moved off the supportive surface.

The primary objective of this invention is to construct motorcycle jack stand which can be operated with a minimum amount of effort by the operator, even operators of minimum strength will have no trouble locating the motorcycle on the jack stand of the present invention.

Another objective of this invention is to construct a motorcycle jack stand which is able to operate satisfactorily on both level and unlevel terrain.

A further objective of this invention is to construct a motorcycle jack stand which can operate satisfactorily on both solid and loose surfaces.

A further objective of this invention is to construct a motorcycle jack stand which only requires a single manual movement to locate the jack stand in the operative position and upon forward longitudinal movement of the motorcycle, the jack stand will automatically retract into a stowage position.

A further objective of this invention is to construct a jack stand which is small in size and therefore can be readily accommodating to a wide variety of different types of motorcycles.

DETAILED DESCRIPTION OF THE INVENTION

Figure 1:
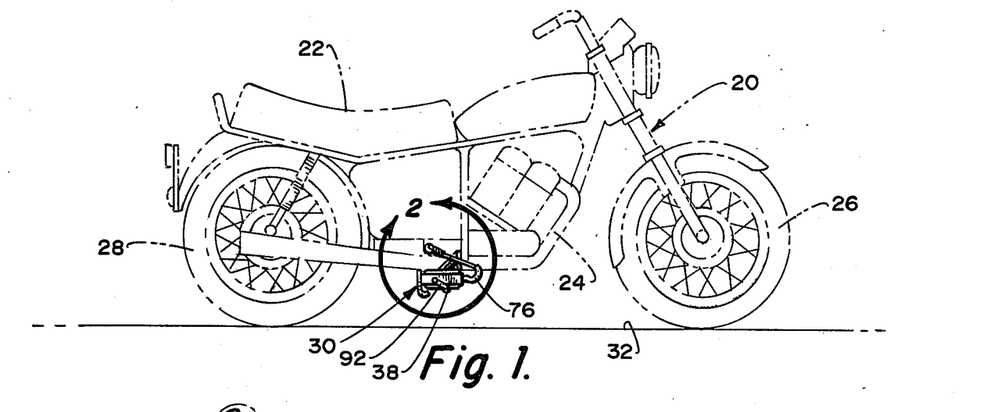
FIG. 1 is a side elevational view of a motorcycle upon which has been mounted the motorcycle jack stand of this invention.

Referring particularly to the drawings, there is shown in FIG. 1 a conventional motorcycle 20 which is constructed generally of a seat 22 which is mounted upon a motorcycle frame or chassis 24. Connected to the frame 24 is a front wheel 26 and a rear wheel 28. The motorcycle jack stand 30 of this invention is to be attached between the wheels 26 and 28 to the frame 24. Actually, the jack stand 30 is mounted to the undercarriage of the frame 24 which is the portion of the frame 24 that is nearest to the supportive surface 32. It is understood that the supportive 32 is the surface upon which the motorcycle 20 is located.

Figure 4:
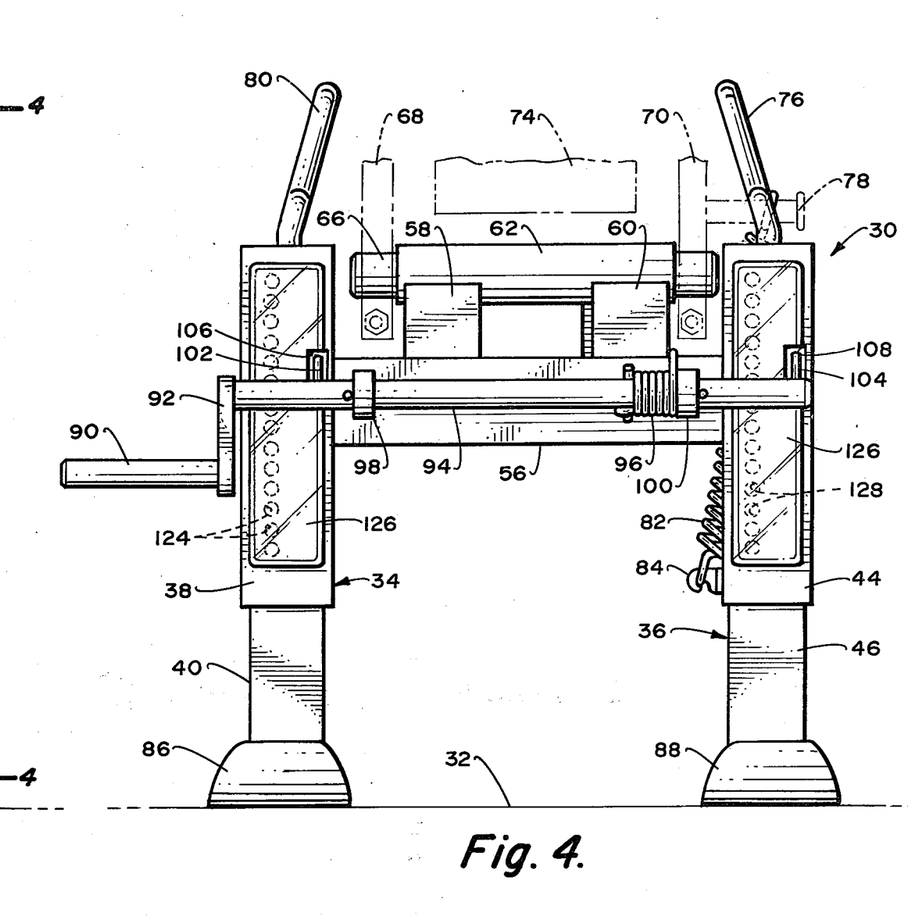
FIG. 4 is a front elevational view of the motorcycle jack stand of this invention taken along line 4—4 of FIG. 3.

The jack stand 30 is generally comprised of a pair of substantially identical stanchion assemblies 34 and 36 (FIG. 4). Each stanchion assembly 34 and 36 is constructed of a sheet material tubing which is square in cross-section. This square cross-sectional shape will prevent relative rotational movement between the different members comprising each of the stanchion assemblies 34 and 36.

Figure 2:
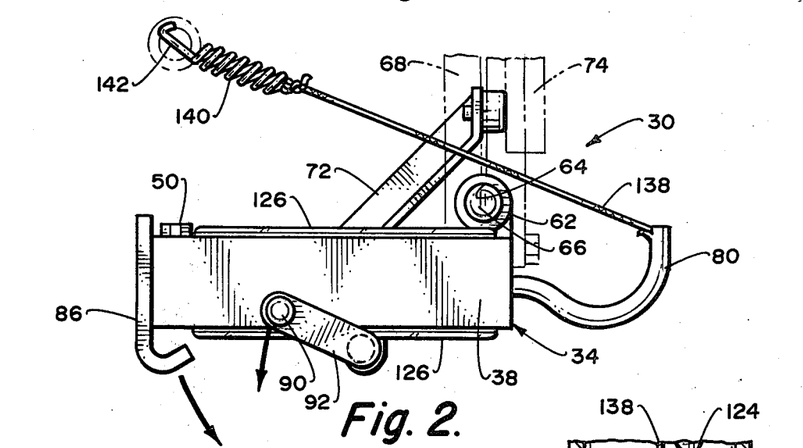
FIG. 2 is an enlarged side elevational view of the motorcycle jack stand of this invention taken along line 2—2 of FIG. 1 showing the motorcycle jack stand in the stowed position.
Figure 3:
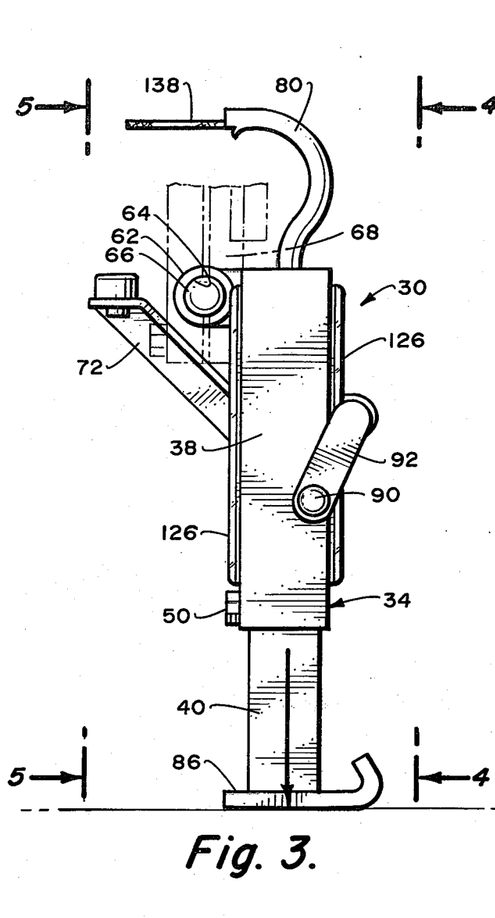
FIG. 3 is a side elevational view of the motorcycle jack stand of this invention showing the jack stand in the extended/usage position.

The stanchion member 34 comprises a main member 38 and a movable member 40. The main member 38 has an internal chamber 42. The movable member 40 is telescopingly received in a close fitting manner within the internal chamber 42. The movable member 40 is movable between a withdrawn position such as shown in FIG. 2 to a protracted position such as is shown within FIG. 3.

Figure 5:
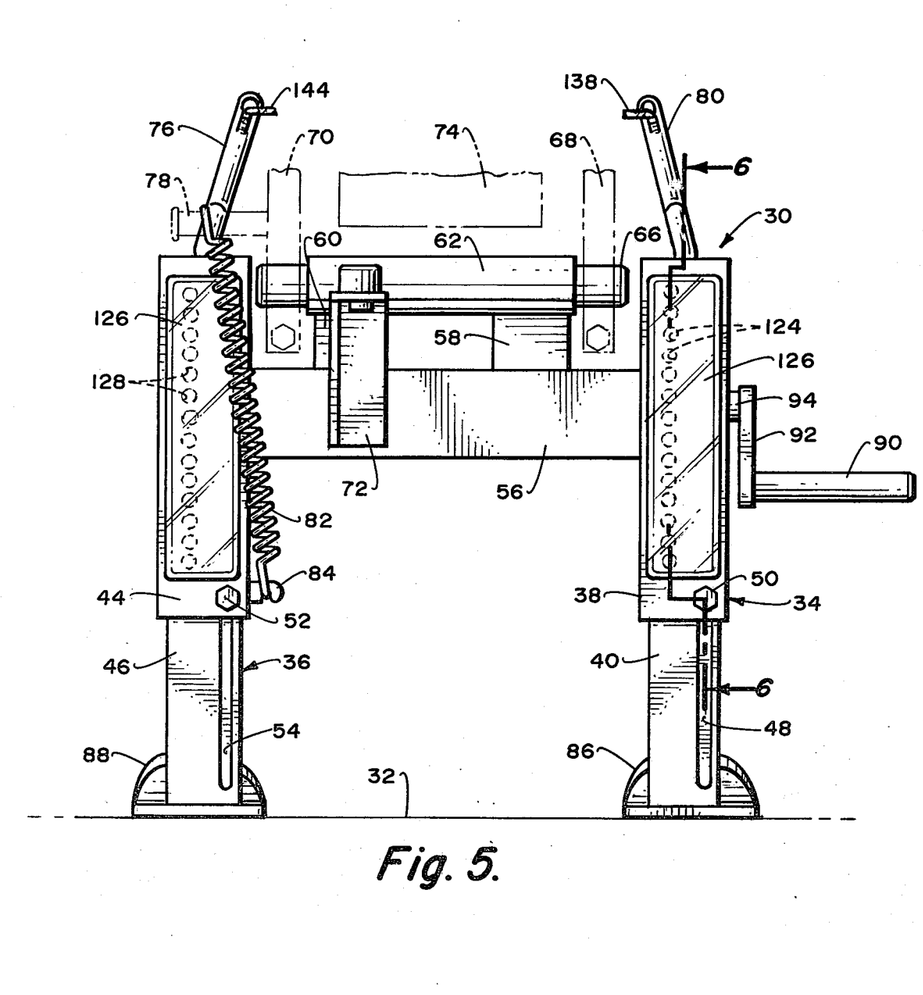
FIG. 5 is a back elevational view of the motorcycle jack stand of this invention taken along line 5—5 of FIG. 3.

It is to be understood that the stanchion assembly 36 includes a main member 44 and a movable member 46 (FIG. 5). The movable member 46 is telescopically received in a close fitting manner within an internal chamber (not shown) formed within the main member 44.

The extent of movement of the movable member 40 with respect to the main member 38 is provided by the physical length of groove 48 which is recessed within the exterior surface of the movable member 40. A threaded fastener 50 is threadably secured through the main member 44 and extends within the groove 48. The fastener 50 will come into physical contact with the ends of the groove 48 thereby functioning as a stop to limit the extent of movement of movable member 40 relative to the main member 38. A similar stop in the form of a threaded fastener 52 connects to the main member 44 and is located within the groove 54 formed within the exterior surface of the movable member 46.

The main members 38 and 44 are fixedly connected together by a connecting member or frame 56. The main members 38 and 44 will normally be connected to member 56 by means of welding or other similar type of positive securement.

Fixedly secured to the connecting member 56 and extending outwardly therefrom are a pair of brackets 58 and 60. Secured to the free end of the brackets 58 and 60 is a sleeve 62. The sleeve 62 includes an internal opening 64. Extending through the internal opening 64 is a shaft 66. The ends of the shaft 66 are fixed by means of mounting brackets 68 and 70. The brackets 68 and 70 are a portion of the motorcycle frame 24. The normal purpose for the brackets 68 and 70 are to support a conventional type of motorcycle center stand which has been removed so as to permit the mounting of the jack stand 30 of this invention.

It is to be understood that the sleeve 62 is pivotable upon the shaft 66. This pivot movement is from a retracted position shown within FIG. 1 to an extended position approximately ninety degrees displaced from the retracted position. For a clear representation of the comparison of the retracted to the extended position, reference is to be had to FIGS. 12A and 12B. With the jack stand 30 in the retracted position, further movement in the retraction direction is prevented by means of stop bracket 72 which is to come into contact with member 74 of the motorcycle frame 24. To limit the movement in the extended direction, the ends of the pair of brackets 58 and 60 will come into contact with the bottom of member 74 of motorcycle frame 24. The guide tube 76 is fixedly secured to the main member 44. It is to be understood that there is a similar guide tube 80 which is fixedly mounted to the main member 38 and is located at a substantially mirror image relationship with respect to the guide tube 76.

A coil spring 82 connects between the rod 78 and an extension 84. The extension 84 is fixedly mounted on the main member 44. It is to be noted that the spring 82 has an overcenter action. In other words, when the jack stand 30 is in the retracted position, the bias of the spring 82 tends to maintain the jack stand 30 in the retracted position. When the jack stand 30 is in the extended position, the bias of the spring 82 exerts a force tending to maintain the jack stand 30 in the extended position. This is accomplished by precise mounting of the spring 82.

It is to be noted that the free outer end of the movable member 40 includes a foot pad 86. A similar foot pad 88 is fixed to the free outer end of the movable member 46. The purpose of the foot pads 86 and 88 are to provide an enlarged planar surface which is rest upon a supportive surface 32.

In order to move the jack stand 30 from the retracted position to the extended position, an operator will normally place one of his feet in contact with rod 90. The rod 90 is connected to an arm 92, which in turn is secured to a latching bar 94. The longitudinal center axis of the latching bar 94 is offset from the center axis of the rod 90. Initial manual force applied to the rod 90 causes the latching bar 94 to be pivoted a few degrees. This pivoting of the latching bar 94 is against the bias of the coil spring 96. Coil spring 96 is against the bias of the coil spring 96. Coil spring 96 is wrapped around the latching bar 94. The latching bar 94 is pivotally mounted by pivot brackets 98 and 100, which are fixedly mounted on connecting member 56.

Figures 7, 8, 9:
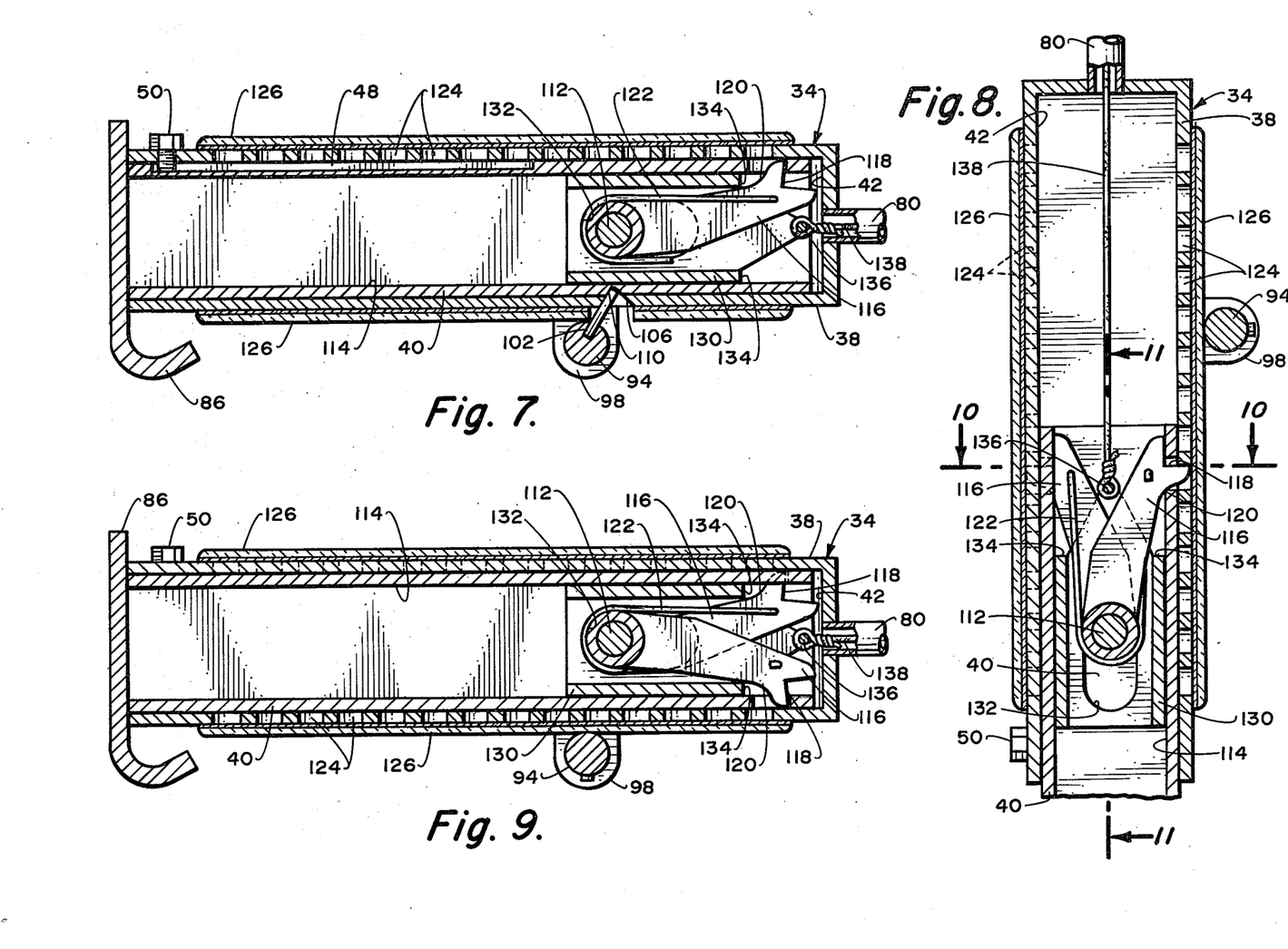
FIG. 7 is a cross-sectional view similar to FIG. 6 but showing the stanchion assembly in the withdrawn or non-extended position.
FIG. 8 is a cross-sectional view similar to FIG. 7 but with a stanchion assembly in an extended position and also showing both pawls included within the ratchet assembly of the stanchion assembly.
FIG. 9 is a view similar to FIG. 7 but showing both pawls included within the ratchet assembly of a single stanchion assembly.
Figure 10:
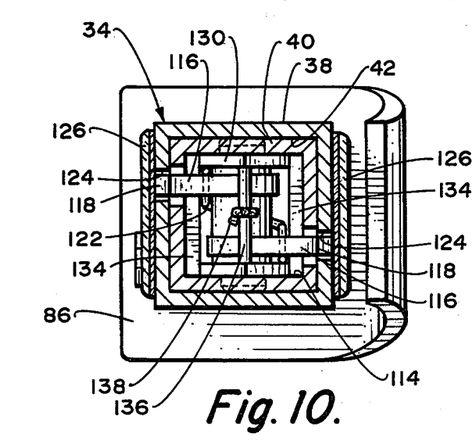
FIG. 10 is a cross-sectional view taken along line 10—10 of FIG. 8.
Figure 11:
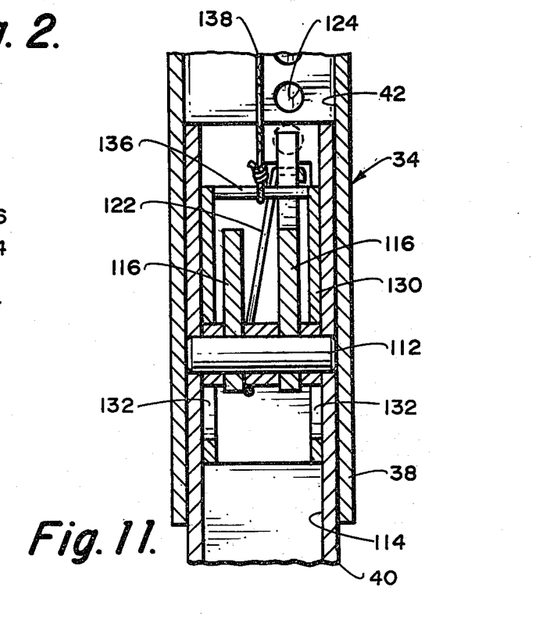
FIG. 11 is a cross-sectional view taken along line 11—11 of FIG. 8.

Fixedly attached to the latching bar 94 are a pair of protuberances 102 and 104. Initial pivoting movement of the latching bar 94 against the bias of the spring 96 causes the protuberances 102 and 104 to respectively enter openings 106 and 108 formed respectively within main members 38 and 44. With the movable member 40 in its fully withdrawn position as shown in FIG. 7, the protuberance 102 also extends within recess 110 formed in the exterior surface of the movable member 40. In a similar manner, the protuberance 104 will connect with a similar recess formed within the exterior surface of the movable member 46 when such is in the fully withdrawn position.

Figure 12A:
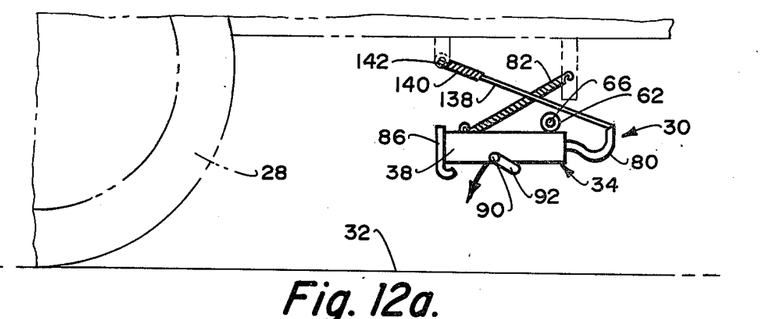
FIGS. 12a–12j are diagrammatic views depicting the entire operation of the jack stand of this invention from movement from the stowage position to the extended position and then the jacking procedure and retracting of the jack stand back to the stowage position.
Figure 12B:
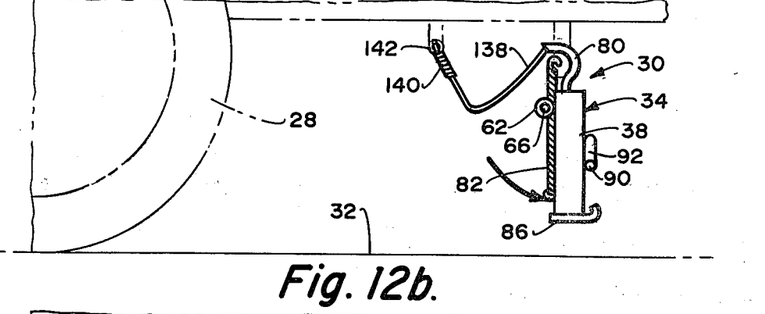

It can thus be made apparent that during initial movement of the rod 90 and initial pivoting of the latching bar 104, that the movable members 40 and 46 are fixed to the respective main members 38 and 44 by means of the protuberances 102 and 104. This fixed relationship is maintained until the jack stand 30 is in the fully extended position as shown in FIG. 12B. At that time, the operator releases the rod 90 which, due to the action of the spring 96, will pivot the latching bar 94 so that the protuberances 102 and 104 become disengaged from the recesses 108 and 110. This permits the movable members 40 and 46 to fall freely by gravity until the foot pads 86 and 88 come into contact with the supportive surface 32.

Located within the interior member 40 is a pivot pin 112. Pivot pin 112 extends entirely across the internal chamber 114 located within the movable member 40 and supported by the walls of member 40. Pivotally mounted on the pivot pin 112 are a pair of locking pawls 116. The pawls 116 are basically identical to each other but are located in a side-by-side, reversely directed manner. Each of the pawls 116 has a shoulder 118 directly adjacent its outer free end. Each pawl 116 also includes a cam surface 120. Both pawls 116 are connected to a spring 122. The spring 122 exerts a continuous bias tending to locate the pawls 116 in a spread-apart manner, as is shown in FIG. 8 of the drawings. When in this spread-apart manner, the portion of each of the pawls 116 directly adjacent the shoulder 118 are capable of connecting with any one opening 124 formed within an aligned column of such openings formed within the main member 38. It is to be noted that there is a single line of openings 124 on the frontal surface of the main member 38 and also a similar line of openings 124 on the rear surface of the main member 38. One of the line of openings 124 is to be connectable with one of the pawls 116, with the other line of openings connected to the other of the pawls 116. In actual practice, it has been found that fourteen in number of openings 124 within each line of such openings is most desirable. However, it is considered to be within the scope of this invention that any number of such openings 124 could be utilized.

For purposes of appearances and for avoiding entry of foreign material within the openings 124, the exterior portion of the openings 124 can be covered by covers 126, if such is desired. The covers 126 will normally comprise a plastic material and will be attached directly onto the main member 38, as well as the main member 44. Also, it is to be understood that a similar pair of pawls, such as pawls 116 will be located within the movable member 46 and are to connect with similar openings 128 formed within the main member 44.

Also mounted within the internal chamber 114 is a cage 130. Within opposite sides of the cage 130 is formed a pair of elongated slots 132 with only one such slot being shown in the drawings. Pivot pin 112 connects with these slots 132. Because of the elongated nature of the slots 132, it can be seen that the cage 130 is capable of lineal movement relative to the pivot pin 112. The extent of this lineal movement is determined by the length of the slots 132.

The end walls of the cage 130 terminate at their upper ends thereof in edges 134. The side walls of the cage 130 are of a greater length than the end walls and are connected together through a pin 136. It is to be understood that this pin is spaced above the edges 134 and is actually located in the space between the pawls 116. The pin 136 is connected to a lanyard in the form of a cable 138. This lanyard 138 extends through the guide tube 80 and connects with a coil spring 140 (FIG. 12A). The coil spring 140 is to be attached to a fixed point 142, which is part of the frame 24 of the motorcycle. It is to be understood that there is a cage similar to cage 130 which is mounted within the movable member 46. Also, within the movable member 46 are a similar pair of pawls, such as pawls 116, which are to connect with the openings 128. The cage located within the movable member 46 is connected through a cable 144, which extends through the guide tube 76. This cable 144 is similarly connected through a coil spring (not shown) to a fixed point similar to fixed point 142.

Figure 6:
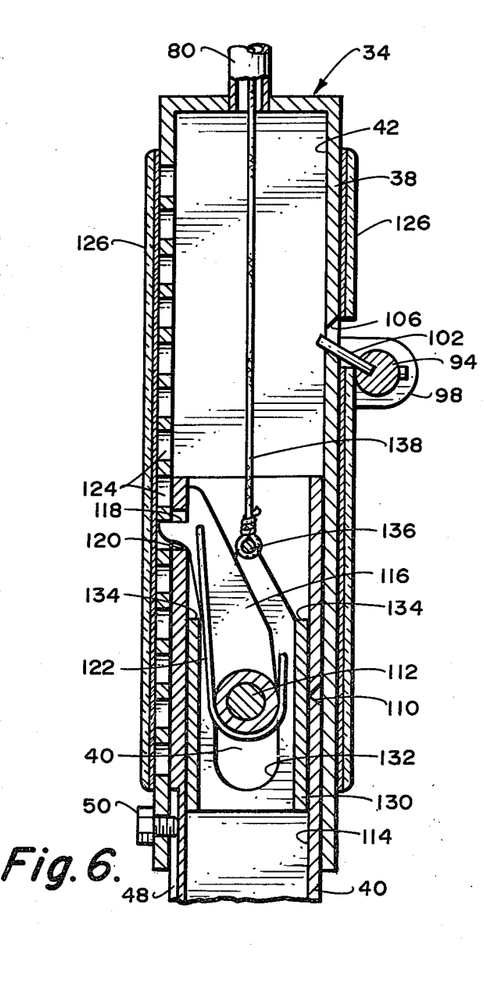
FIG. 6 is a cross-sectional view through one of the stanchion assemblies incorporated within the motorcycle jack stand of this invention taken along line 6—6 of FIG. 5 showing the stanchion assembly in the protracted position.
Figure 12C:
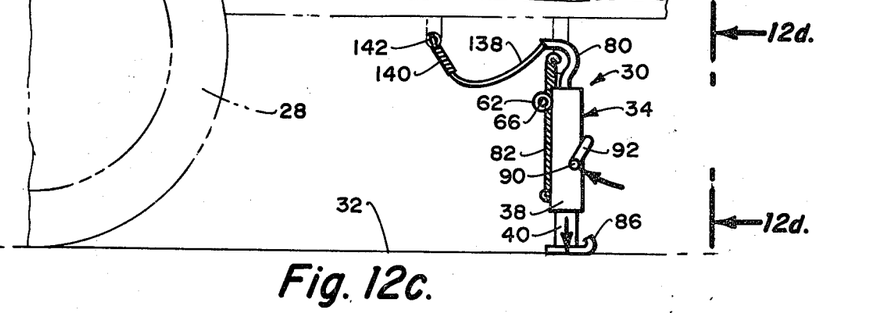
Figure 12D:
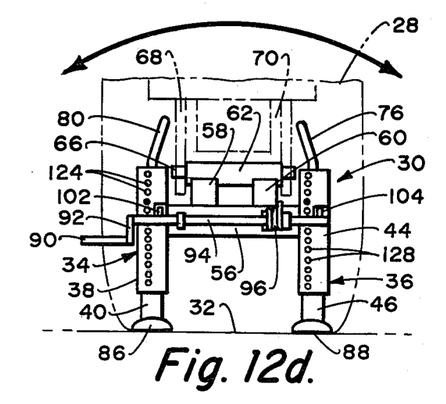
Figure 12E:
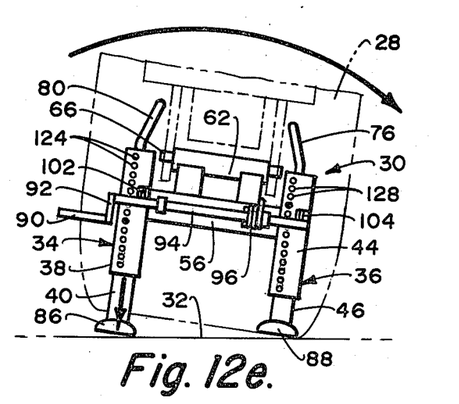

With the stanchions 34 and 36 in the extended position, such as depicted within FIG. 12C, the cables 138 and 144 are quite slack, which causes the cages, such as cage 130, to be in the position as shown within FIG. 6 of the drawings. However, upon the stanchion assembly moving to the retracted position, the cables 138 and 144 become taut and move their respective cages, such as cage 130, to an upper position until the edges 134 physically contact the cam surfaces 120. This causes the pawls 116 to be moved inwardly and become disassociated from their openings 124 and similarly the other pawls within the member 46 become disassociated from the openings 128. This position is depicted within FIG. 9 of the drawings. When the pawls 116 are in contact with the openings 124, movement of the movable member 40 toward the withdrawn position shown in FIG. 9 is prevented. As the movable member 40 continues to move to a further protracted position, the pawls 116 merely ratchet and connect with the next succeeding opening 124, and so forth. The pawls 116 are to prevent movement toward the withdrawn position as long as they are engaged with an opening 124.

The operation of the jack stand 30 of this invention is as follows: Reference is to be had particularly to FIGS. 12A to 12J, which clearly depict sequential operation of the jack stand 30.

In FIG. 12A, the jack stand 30 is shown in the stowed position, with the rear wheel 28 of the motorcycle in contact with the supportive surface 32. This is the position that the jack stand 30 will normally be in when the motorcycle 20 is being operated.

Let it be assumed that the motorcycle 20 has assumed a stopped position and it is desired to locate the motorcycle 20 on a supporting stand. The operator places his foot on rod 90 and causes approximately ten to fifteen degrees pivoting of the latching bar 94. This causes the protuberances 102 and 104 to be moved within their respective recesses, such as recess 110 for the movable member 40. As the jack stand 30 is then moved from the retracted position to the extended position as shown in FIG. 12B, the movable members 40 and 46 have not fallen which could interfere with this movement to the extended position.

When the operator releases the force against the rod 90, the rod 90 will automatically pivot under the bias of the spring 96 to its unpivoted position. At this time, the movable members 40 and 46, as previously mentioned, are free to fall and come into contact with the supportive surface 32.

Figure 12F:
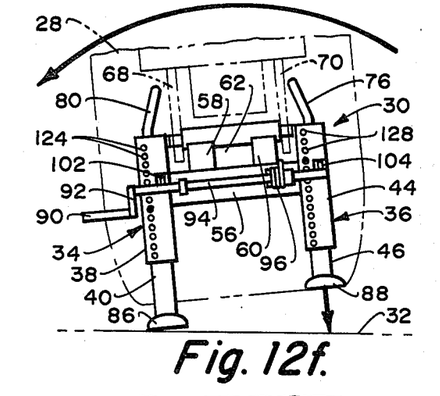
Figure 12G:
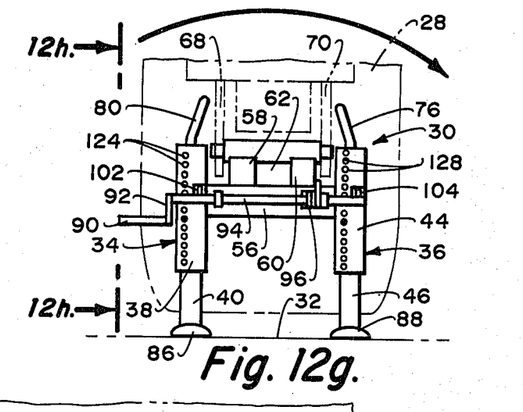
Figure 12H:
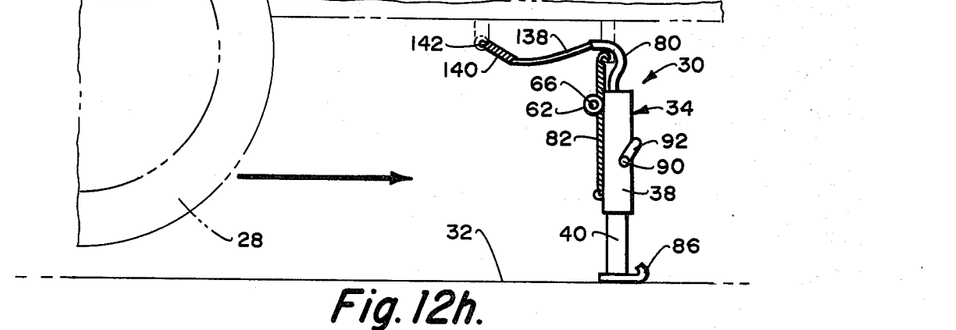
Figure 12I:
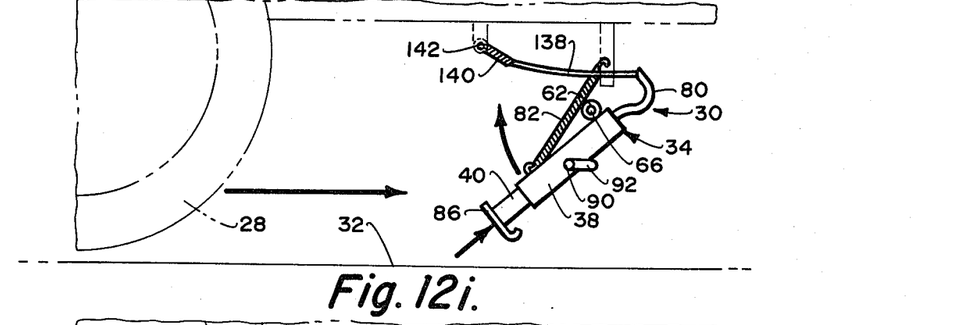
Figure 12J:
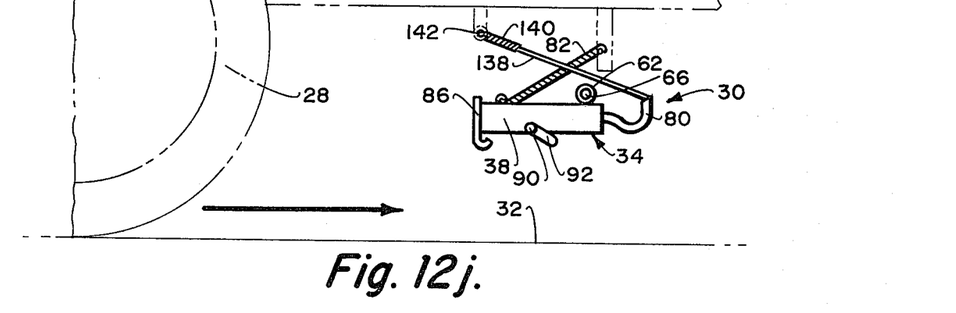

The operator then proceeds to rock the motorcycle 20 side to side. This rocking action in one direction is shown in comparing FIGS. 12D to 12E. Within FIG. 12E, it can be seen that the movable member 40 then extends a greater distance. The movable member 40 will be maintained in this extended position by the pawls 116 connecting with other openings 124, the position of which is shown as the solid single opening 124 in the string of the openings in the aligned string of the opening 124 within FIG. 12E. The operator then proceeds to pivot the motorcycle in the opposite lateral direction, as is shown in FIG. 12F. This causes the movable member 46 to fall freely to the supportive surface 32 thereby assuming an extended position. It can be seen that by repeating this lateral, side-to-side movement, that the movable members 40 and 46 continue to extend until the rear wheel 28 of the motorcycle is actually moved off of the supportive surface 32. At this particular time, the motorcycle 20 is then firmly supported by the jack stand 30.

In order to move the jack stand 30 from the extended position to the stowed position, the operator only needs to apply a force to the motorcycle 20 in the forward direction which will cause the stanchion assemblies 34 and 36 to begin to move toward the stowed position. The force of the spring 82 will then automatically move the stanchion assemblies 34 and 36 into the stowed position. As the stanchion assemblies 34 and 36 move to the stowed position, the cables 138 and 144 move their respective cages (such as cage 130 for cable 138) disengaging their respective pawl assembly (such as pawls 116) from openings 124. At this particular time, the movable members 40 and 46 are moved to the completely withdrawn position.

Referring particularly to FIGS. 13-16, there is shown the first modified form 146 of the jack stand of this invention. Jack stand 146 includes a stanchion assembly 148 with it being understood that in actual practice, there will be utilized two separate stanchion assemblies as was described in relation to the previous structure. It is to be understood that the stanchion assembly 148 is to be constructed, as also was previously described, of a main stanchion member 150 and a movable stanchion member 152. The movable member 152 will be telescopingly received within the main member 150. The free end of the movable member 152 terminates in a foot pad 154. It is to be understood that there will be a pawl assembly (not shown) located within the movable member 152, as previously described.

The main distinction of jack stand 146 in relation to jack stand 30 is that with jack stand 146, there is no need to utilize the fixed point 142. In other words, connection of spring 140 to fixed point 142 has been eliminated. The jack stand 146 will be mounted, as previously described, utilizing the mounting sleeve 62 through which is conducted the shaft 66, which is supported by mounting bracket 68 and 70. However, even though the fixed point 142 has been eliminated, the cable 156, which is conducted through the guide tube 158, still must be able to become taut as the jack stand moves from the extended position shown in FIG. 15 to the retracted position shown in FIG. 13. In order to achieve this result, the coil spring 160, which is attached to the cable 156, is connected to the outer free end of a link 162. The inner end of the link 162 is pivotably attached to a bracket 164, which in turn is secured to the exterior of the main member 150. A connecting link 166 is pivotally connected between the link 162 (intermediate the ends of the link 166) and to a plate 168. The plate 168 includes a first protuberance 170 and a second protuberance 172. A plate 168 is integrally connected to a ring 174. The actual width of the ring 174 need not be any more than an eighth or a quarter of an inch. This ring is to be located in axial alignment with the sleeve 62, with it being understood that there will actually be two separate rings 174 with a separate ring located at each end of the sleeve 62. One of the rings 174 will be located directly adjacent mounting bracket 68, with the other being located directly adjacent mounting bracket 70. Each of the rings 174 are freely pivotable on the shaft 66 and are free of the sleeve 62. However, there is a close fit relationship between the end of the sleeve 62, the rings 174 and their respective bracket 68 and 70.

The function of the protuberance 170 is to limit the motion of the plate 168 in the counter-clockwise direction. The function of the protuberance 172 is to limit the motion of the plate 168 in the clockwise direction. Each of the protuberances 170 and 172 are designed to come into contact with a fixed portion (not shown) of the frame of the motorcycle.

The jack stand 146 can be operated by one foot or by hand. When operated by hand, an appropriate hand actuation mechanism is located directly adjacent the seat 22 of the motorcycle 20. This hand actuation mechanism includes an actuating cable 176 which is to be mounted within a sheath 178, which is in turn mounted by brackets 180 to the frame 24 of the motorcycle 20. The cable 176 is conducted through an opening provided within an arm 182. The end of the cable 176, after passing through the opening in the arm 182, is enlarged to form enlargement 184. This prevents complete disassociation of the cable 176 from the arm 182. Initial manual pulling of the cable 176 causes the arm 182 to freely pivot about seventy degrees from the stowed position shown in FIG. 13. The reason for this is so that the arm 182 will now be in a position to facilitate operation of the jack stand 146. Otherwise, there could be an undesirable binding action which could hinder operation if the arm 182 was not extended some distance from the main stanchion member 150.

Figure 13:
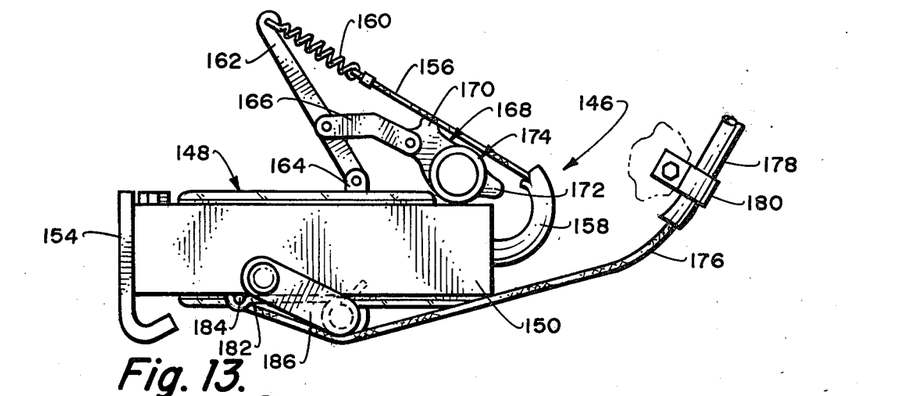
FIG. 13 shows a side elevational view of a first modified form of motorcycle jack stand of this invention showing the jack stand in the retracted position.
Figure 14:
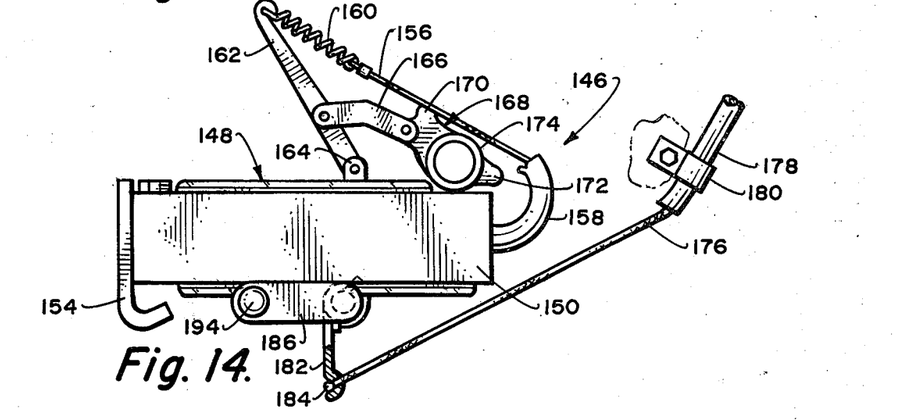
FIG. 14 is a view similar to FIG. 13, but showing the jackstand in an intermediate position of movement from the retracted position to an extended position.

Continued further movement of the arm 182 from the aforementioned seventy degree position results in the arm 186 being pivoted fifteen to twenty degrees from the position shown in FIG. 13 to the position shown in FIG. 14. The arm 186 is essentially identical to the arm 92 previously described. This twenty degree pivoting action is so that the protuberances (only protuberance 188 being shown) which are similar to previously described protuberances 102 and 104, are to connect together the main member 150 and the movable member 152 in the same manner as previously described. The protuberances, such as protuberance 188 are attached to a latching bar 190. The latching bar 190 is normally biased by a spring 192 to the position shown in FIG. 13 of the drawings.

Figure 15:
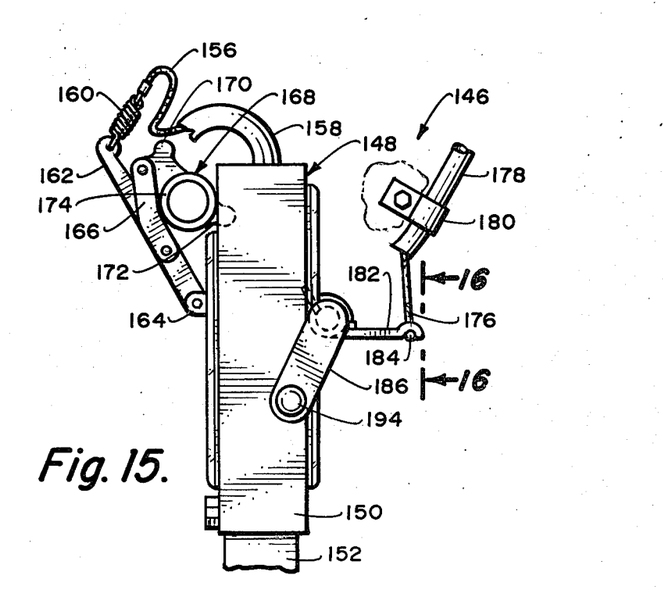
FIG. 15 is a side elevational view showing the motorcycle jack stand of FIG. 13 in the fully extended position.
Figure 16:
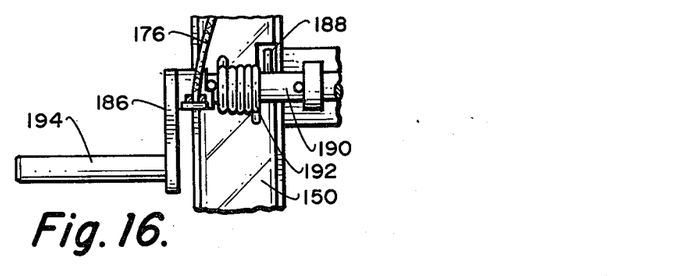
FIG. 16 is a view taken along line 16—16 of FIG. 15 to show in more detail the actuating mechanism utilized in conjunction with the jack stand of FIG. 13.

Continued further pulling action on the cable 176 will then cause the dual stanchion assembly of the jack stand 146 to be pivoted ninety degrees from the position shown in FIG. 14 to the position shown in FIG. 15. When in FIG. 15, the stanchion assembly will normally be held in that position by an overcenter spring assembly which is similar to previously described spring 82. The operator will release the pulling force on cable 176 and allow the arms 182 and 186 to return to the position shown in FIG. 13 allowing movable member 152 to fall by gravity to surface 32. Retraction of the jack stand 146 is accomplished in the same manner as the jack stand 30.

If an individual wishes to have the jack stand 146 to be foot operated, a rod 194 could be utilized which is essentially identical to the previously described rod 90.

Figures 17, 18:
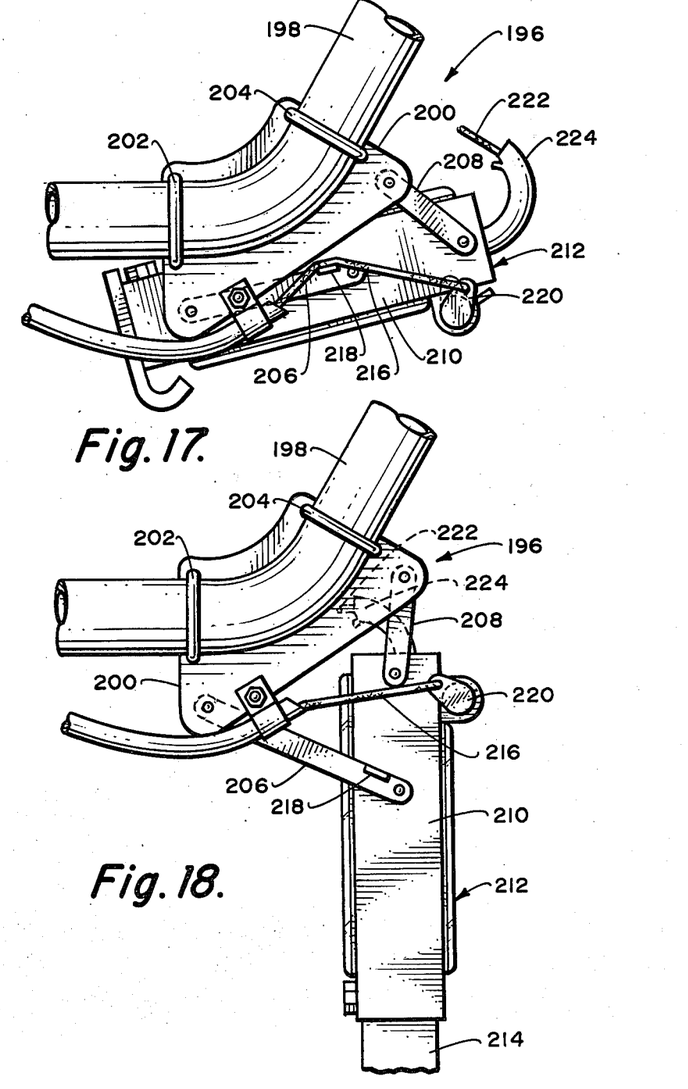
FIG. 17 is a side elevational view of a second modified form of the jack stand of this invention showing the jack stand in the retracted position.
FIG. 18 is a view similar to FIG. 17 but showing the second modified form of jack stand of this invention in the fully extended position.

Referring particularly to FIGS. 17 and 18, there is shown a second modified form 196 of jack stand of this invention. The modified form of jack stand 196 is to be mounted on a portion of the frame 198 of the motorcycle to raise the front wheel 26 of the motorcycle 20. It is envisioned that the desired placement in respect to the motorcycle 20 will be directly adjacent the front wheel 26.

The jack stand 196 includes a mounting plate 200 which is secured by appropriate U-bolt fasteners 202 and 204 to the frame member 198. A first link 206 is pivotally mounted to one end of the plate 200, while a second link 208 is pivotally mounted to the opposite end of the plate 200. Both free ends of the links 206 and 208 are pivotally mounted onto the main member 210 of the stanchion assembly 212, which is identical to the stanchion assemblies previously described. There is to be a movable member 214 which is movably mounted within the interior the main member 210.

There is to be utilized an overcenter spring assembly (not shown) which is to biasingly locate the stanchion assembly 212 in the retracted position shown in FIG. 17. To move the stanchion assembly 212 to the extended position, a hand operated cable 216 is utilized which pushes against flange 218 integrally formed on the link 206. This begins the pivoting motion of the link 206 in the desired direction and actually, the link 206 must be moved over center so that the stanchion assembly 212 can be moved to the extended position. It is also to be understood that the cable 216 will be connected to an arm 220 which is essentially similar to arm 186 and 92. Pivoting of the arm 220 results in appropriate protuberances (not shown) which are similar to protuberances 102 and 104 to lock together the main member 210 and the movable member 214, as previously described.

Upon the link 206 being moved over center, the continued pulling action on the cable 216 will result in the stanchion assembly 212 being moved to the extended position shown in FIG. 18.

It is to be noted that there will be utilized in the manner as previously described, a similar retraction arrangement in the form of a cable 222 which passes through a guide tube 224. The cable 222 and the guide tube 224 are similar to previously described parts 138 and 80.

Movement from the extended position as shown in FIG. 18 to the retracted position shown in FIG. 17 will be accomplished in the previously described manner.

With the jack stand 196 mounted forward of the longitudinal center of gravity of the motorcycle 20, the front wheel 26 will be raised and the rear wheel 28 will remain in contact with supportive surface 32. In this position, the motor may be started and the motorcycle 20 driven forward to raise the jack stand 196 from the extended position to the retracted position.

What is claimed is:

1. A motorcycle jack stand comprising:
a frame adapted to be mounted on a motorcycle;
a first stanchion mounted on said frame, a second stanchion mounted on said frame, said second stanchion being spaced from said first stanchion, both said first stanchion and said second stanchion being movable between a retracted stowage position and an extended usable position;
said first stanchion constructed of a first main member and a first movable member, said first movable member being movable between a first withdrawn position and a first protracted position, said first protracted position being when the free outer end of said first movable member is in contact with a supportive surface;

said second stanchion constructed of a second main member and a second movable member, said second movable member being movable between a second withdrawn position and a second protracted position, said second protracted position being when the free outer end of said second movable member is in contact with a supportive surface;

a first ratchet assembly connected to said first stanchion, movement of said first movable member is permitted only in the direction toward said first protracted position when said first ratchet assembly is in operation;

a second ratchet assembly connected to said second stanchion, movement of said second movable member is permitted only in the direction towards the second protracted position when said second ratchet assembly is in operation;

whereby with said first and second movable members in contact with the supportive surface in their respective first and second protracted positions, reversing lateral movements of the motorcycle causes said first and second movable members to move relative to the respective first and second main members resulting in the motorcycle being partially supported on said first and second stanchions;

said first ratchet assembly comprising a first pawl assembly, said second ratchet assembly comprising a second pawl assembly, both said first and second pawl assemblies being movable between a disengaged position and an engaged position, with said first and second pawl assemblies in said engaged position each said movable member being capable of movement toward said first and second protracted position, both said first and second pawl assemblies being continuously biased toward said engaged positions; and retraction means for moving said first and second movable members from their respective said first and second protracted positions to said first and second withdrawn positions, said retraction means including structure to physically engage with said first and second pawl assemblies to move such to said disengaged position.

2. The motorcycle jack stand as defined in claim 1 including:

a latching bar assembly connected to both said first stanchion and said second stanchion, said latching bar assembly to fix the position of both said first and second movable members relative to said first and second main members during movement from said retracted stowage.

3. A motorcycle jack stand comprising:

a frame adapted to be mounted on a motorcycle;

a first stanchion mounted on said frame, a second stanchion mounted on said frame, said second stanchion being spaced from said first stanchion, both said first stanchion and said second stanchion being movable between a retracted stowage position and an extended usable position;

said first stanchion constructed of a first main member and a first movable member, said first movable member being movable between a first withdrawn position and a first protracted position, said first protracted position being when the free outer end of said first movable member is in contact with a supportive surface;

said second stanchion constructed of a second main member and a second movable member, said second movable member being movable between a second withdrawn position and a second protracted position, said second protracted position being when the free outer end of said second movable member is in contact with a supportive surface;

a first ratchet assembly connected to said first stanchion, movement of said first movable member is permitted only in the direction toward said first protracted position when said first ratchet assembly is in operation;

a second ratchet assembly connected to said second stanchion, movement of said second movable member is permitted only in the direction towards the second protracted position when said second ratchet assembly is in operation;

whereby with said first and second movable members in contact with the supportive surface in their respective first and second protracted positions, reversing lateral movements of the motorcycle causes said first and second movable members to move relative to the respective first and second main members resulting in the motorcycle being partially supported on said first and second stanchions;

said first ratchet assembly comprising a first pawl assembly, said second ratchet assembly comprising a second pawl assembly, both said first and second pawl assemblies being movable between a disengaged position and an engaged position, with said first and second pawl assemblies in said engaged position each said movable member being capable of movement toward said first and second protracted position, both said first and second pawl assemblies being continuously biased toward said engaged positions;

retraction means for moving said first and second movable members from their respective first and second protracted positions to said first and second withdrawn positions, said retraction means including structure to physically engage with said first and second pawl assemblies to move such to said disengaged position; and said structure comprising a first cage and a second cage, said first cage being movably mounted interiorly of said first movable member, said second cage being movably mounted interiorly of said second movable members, said first pawl assembly being mounted on said first cage, said second pawl assembly being mounted on said second cage.

4. The motorcycle jack stand as defined in claim 3 wherein:

said first and second cages being moved into contact with their respective said first and second pawl assemblies during movement of said first and second stanchions from said extended usable position to said retracted stowage position causing said first and second pawl assemblies to move to said disengaged position.

5. The motorcycle jack stand as defined in claim 4 wherein:

overcenter spring means attached to said frame, said overcenter spring means tending to maintain said first and second stanchions in said retracted stowage position when located in that position, said overcenter spring means tending to maintain said first and second stanchions in said extended usable position when located in that position.

6. A motorcycle jack stand comprising:

a frame adapted to be mounted on a motorcycle;

a first stanchion mounted on said frame, a second stanchion mounted on said frame, said second stanchion being spaced from said first stanchion, both said first stanchion and said second stanchion being movable between a retracted stowage position and an extended usable position;

said first stanchion constructed of a first main member and a first movable member, said first movable member being movable between a first withdrawn position and a first protracted position, said first protracted position being when the free outer end of said first movable member is in contact with a supportive surface;

said second stanchion constructed of a second main member and a second movable member, said second movable member being movable between a second withdrawn position and a second protracted position, said second protracted position being when the free outer end of said second movable member is in contact with a supportive surface;

a first ratchet assembly connected to said first stanchion, movement of said first movable member is permitted only in the direction toward said first protracted position when said first ratchet assembly is in operation;

a second ratchet assembly connected to said second stanchion, movement of said second movable member is permitted only in the direction towards the second protracted position when said second ratchet assembly is in operation;

whereby with said first and second movable members in contact with the supportive surface in their respective first and second protracted positions, reversing lateral movements of the motorcycle causes said first and second movable members to move relative to the respective first and second main members resulting in the motorcycle being partially supported on said first and second stanchions;

a latching bar assembly connected to both said first stanchion and said second stanchion, said latching bar assembly to fix the position of both said first and second movable members relative to said first and second main members during movement from said retracted stowage position; and said latching bar assembly being continuously biased by a spring means to the position which maintains freely movable said first and second movable members relative to their respective said first and second main members, said spring means being located between said latching bar assembly and said frame.

7. A motorcycle jack stand comprising:
a frame;
a stanchion means mounted on said frame, said stanchion means being movable between a retracted/stowage position and an extended/usage position, said stanchion means being movable from a withdrawn position to a protracted position when in said extended/usage position;

ratchet means connected to said stanchion means, said ratchet means permitting incremental movement of said stanchion means towards said protracted position;

said stanchion means comprising two separate stanchion assemblies located in a spaced-apart and connected together to operate in unison from said retracted/stowage position to said extended/usage position; and latching means connected to said stanchion means, said latching means including structure which is movable between an engaging position and a non-engaging position, when said latching means is in said non-engaging position is movement permitted of said stanchion means to said protected position with only such occurring when said stanchion means is in said extended/usage position.

8. The motorcycle jack stand as defined in claim 7 wherein:
said stanchion means being connected to an overcenter spring assembly, said overcenter spring assembly to tend to maintain said stanchion means in said retracted/stowage position when in that position and tend to maintain said stanchion assembly in said extended/usage.

9. The motorcycle jack stand as defined in claim 7 wherein:
said stanchion means comprises two separate stanchion assemblies, each said stanchion assembly being constructed of a fixed member and a movable member which are connected together in a telescoping arrangement.

10. The motorcycle jack stand as defined in claim 7 wherein:
said stanchion means comprising a pair of spaced apart stanchion assemblies, each said stanchion assembly including a fixed member and a movable member, a pawl assembly connected between said fixed member and said movable member, said pawl assemblies permitting incremental movement of said movable members relative to said fixed members, said pawl assemblies being movable between a disengaged position and an engaged position, said disengaged position permitting freedom of movement of said movable members relative to their respective said fixed member, said engaged position only permitting the incremental movement of said movable members to said protracted position, disengagement means for connecting with said pawl means to move such to the disengaged position.

11. A motorcycle jack stand comprising:
a frame;
a stanchion means mounted on said frame, said stanchion means being movable between a retracted/stowage position and an extended/usage position, said stanchion means being movable from a withdrawn position to a protracted position when in said extended/usage position;

ratchet means connected to said stanchion means, said ratchet means permitting incremental movement of said stanchion means towards said protracted position;

said stanchion means comprises two separate stanchion assemblies, each said stanchion assembly being constructed of a fixed member and a movable member which are connected together in a telescoping arrangement; and retraction means attached to said movable members, during movement of said stanchion means from extended usage position to said retracted/stowage position the said retraction means automatically moves said movable members to said withdrawn position.

12. In combination with a motorcycle, said motorcycle having a motorcycle chasis, a motorcycle center jack stand mounted on said motorcycle chasis, said motorcycle center jack stand comprising:
a frame;
stanchion means mounted on said frame, said stanchion means being movable between a retracted position to facilitate stowage and an extended position for usage, said stanchion means when in said extended position being separately movable between a withdrawn position and a protracted position; and securing means connected to said stanchion means, said securing means being movable between an engaged position and a disengaged position, with said securing means located in said engaged position and said stanchion means located in said extension position said stanchion means being permitted to move from said withdrawn position to said protracted position but prevented from moving from said protracted position toward said withdrawn position, said securing means being lockable in any single position of a plurality of locking positions.

13. The combination as defined in claim 12 including: disengagement means attached to said securing means, said disengagement means for moving said securing means to said disengaged position thereby permitting movement of said stanchion means from said protracted position to said withdrawn position.

14. The combination as defined in claim 13 wherein: said securing means comprising a spring biased pawl assembly, said disengagement means comprising a movable cage, said movable cage to cam against said pawl assembly to move said pawl assembly against the spring bias so as to move said pawl assembly to said disengaged position.

15. The combination as defined in claim 14 wherein: said stanchion means comprising a plurality of spaced apart stanchion assemblies, each said stanchion being substantially identical to each other, each said stanchion assembly including a main stanchion member and a movable stanchion member, said movable stanchion member being telescopingly received within its respective said main stanchion member, said pawl assembly being located within each said movable stanchion member, said movable cage being located within each said movable stanchion member.

16. The combination as defined in claim 15 including: overcenter spring biasing means connected between said motorcycle chassis and said stanchion means, said overcenter spring biasing means to exert a continuous bias tending to locate said stanchion means in said retracted position when located in said retracted position, said overcenter spring bias means also exerting a bias tending to locate said stanchion means in said extended position when in said extended position.

17. The combination as defined in claim 16 including: a latching assembly connected to said stanchion means, said latching assembly to fix together each pair of said movable stanchion members and said main stanchion members to prevent relative movement therebetween during movement of said stanchion means from said retracted position to said extended position.

18. The combination as defined in claim 15 wherein: a latching assembly connected to said stanchion means, said latching assembly to fix together each pair of said movable stanchion members and said main stanchion members to prevent relative movement therebetween during movement of said stanchion means from said retracted position to said extended position.

19. The combination as defined in claim 15 including: actuation means attached to said movable cage, said actuation means for moving said movable cage which in turn moves said pawl assembly to the disengaged position, said actuation means being activated only when said stanchion assembly is substantially located in said retracted position.

20. The combination as defined in claim 19 wherein: said actuation means includes a linkage assembly, a portion of said linkage assembly being mounted on the exterior surface of said main member, lanyard means being connected from said linkage assembly to said movable cage.

* * * * *